US012658450B2

(12) United States Patent
Baddeloo et al.

(10) Patent No.: US 12,658,450 B2
(45) Date of Patent: Jun. 16, 2026

(54) CURRENT COLLECTOR FOR REDOX FLOW BATTERIES

(71) Applicant: UOP LLC, Des Plaines, IL (US)

(72) Inventors: Michael G. Baddeloo, Northbrook, IL (US); Stuart R. Miller, Arlington Heights, IL (US); Russell D. Schumaker, Glen Ellyn, IL (US)

(73) Assignee: UOP LLC, Des Plaines, IL (US)

( * ) Notice: Subject to any disclaimer, the term of this patent is extended or adjusted under 35 U.S.C. 154(b) by 839 days.

(21) Appl. No.: 17/821,723

(22) Filed: Aug. 23, 2022

(65) Prior Publication Data

US 2023/0187652 A1     Jun. 15, 2023

Related U.S. Application Data

(60) Provisional application No. 63/265,222, filed on Dec. 10, 2021.

(51) Int. Cl.
H01M 4/66 (2006.01)
H01M 8/18 (2006.01)

(52) U.S. Cl.
CPC .......... H01M 4/661 (2013.01); H01M 8/188 (2013.01)

(58) Field of Classification Search
CPC .............. H01M 4/64–84; H01M 8/0202–0269
See application file for complete search history.

(56) References Cited

U.S. PATENT DOCUMENTS

| | | | |
|---|---|---|---|
| 2009/0098432 A1* | 4/2009 | Rosenberg .......... | H01M 8/2459 |
| | | | 429/400 |
| 2011/0287314 A1 | 11/2011 | Jung | |
| 2015/0125756 A1 | 5/2015 | Kim et al. | |
| 2018/0342752 A1* | 11/2018 | Park .................... | H01M 8/0263 |
| 2019/0260033 A1* | 8/2019 | Kajiwara ........... | H01M 4/8626 |
| 2021/0391582 A1 | 12/2021 | Lee et al. | |

FOREIGN PATENT DOCUMENTS

| | | | | |
|---|---|---|---|---|
| CN | 201266642 Y | | 7/2009 | |
| CN | 101656321 A | * | 2/2010 | |
| CN | 10877408 A | | 11/2010 | |
| CN | 202268439 U | | 6/2012 | |
| CN | 102867978 B | | 1/2013 | |
| CN | 202905873 U | | 4/2013 | |
| CN | 103840188 B | | 1/2016 | |
| CN | 104600340 B | | 12/2018 | |
| CN | 110190314 A | | 8/2019 | |
| CN | 110854401 A | * | 2/2020 | .......... H01M 8/0213 |
| CN | 112072127 A | | 12/2020 | |

(Continued)

OTHER PUBLICATIONS

CN101656321A—machine translation (Year: 2010).*

(Continued)

*Primary Examiner* — Haroon S. Sheikh

(57) ABSTRACT

Various current collectors for redox flow batteries are described. The current collectors include at least one metal plate encapsulated in a conductive polymer end plate, the metal plate to the back of a stack end plate with a conductive adhesive, and a flat metal plate having deformable tabs. Battery flow systems incorporating the current collectors are also described. Battery flow systems with easily replaceable current collectors are also described.

7 Claims, 4 Drawing Sheets

(56) References Cited

FOREIGN PATENT DOCUMENTS

| CN | 112159634 | A | 1/2021 |
|----|-----------|----|---------|
| EP | 3046173 | A1 | 7/2016 |
| EP | 3539176 | A1 | 9/2019 |
| JP | H06140028 | A | 5/1994 |
| JP | 3535865 | B2 | 6/2004 |
| JP | 2015521345 | A | 7/2015 |
| KR | 101291752 | B1 | 7/2013 |
| KR | 101353961 | B1 | 1/2014 |
| KR | 101394255 | B1 | 5/2014 |
| KR | 20140134466 | A | 11/2014 |
| KR | 101549945 | B1 | 8/2015 |
| KR | 20180033805 | A | 4/2018 |
| KR | 1020200055311 | A | 5/2020 |
| KR | 1020200063893 | A | 6/2020 |
| KR | 20210033722 | A | 3/2021 |
| KR | 1020210092038 | A | 7/2021 |
| WO | 2018044236 | A1 | 3/2018 |
| WO | 2018087220 | A1 | 5/2018 |

OTHER PUBLICATIONS

CN110854401A—machine translation (Year: 2020).*

International Search Report from corresponding PCT application No. PCT/US2022/081006 mailed Apr. 19, 2023.

Written Opinion from corresponding PCT application No. PCT/US2022/081006 completed Apr. 17, 2023.

Risbud, Mandar et al., Vanadium Oxygen Fuel Cell Utlising High Concentration Electrolyte, Batteries, 2019, 5, 24; doi:10.3390/batteries5010024.

Liu, Tianbiao, et al., A Total Organic Aqueous Redox Flow Battery Employing a Low Cost and Sustainable Methyl Viologen Anolyte and 4-HO-TEMPO Catholyte, Adv. Energy Mater., 2016, 6, 1051449.

M Al-Yasiri et al., A novel cell design of vanadium redox flow batteries for enhancing energy and power performance, Applied Energy, vol. 222, 2018, pp. 530-539.

Extended European Search Report from corresponding European application No. 22905291.5 dated Mar. 27, 2026.

* cited by examiner

CURRENT COLLECTOR FOR REDOX FLOW BATTERIES

RELATED APPLICATIONS

This application claims priority to U.S. Provisional Patent Application Ser. No. 63/265,222, filed on Dec. 10, 2021, the entirety of which is incorporated herein by reference.

BACKGROUND

Energy storage systems have played a key role in harvesting energy from various sources. The energy storage systems can be used to store energy and convert it for use in many different applications, such as building, transportation, utility, and industry. A variety of energy storage systems have been used commercially, and new systems are currently being developed. Energy storage types can be categorized as electrochemical and battery, thermal, thermochemical, flywheel, compressed air, pumped hydropower, magnetic, biological, chemical and hydrogen energy storages. The development of cost-effective and eco-friendly energy storage systems is needed to solve energy crisis and to overcome the mismatch between generation and end use.

Renewable energy sources, such as wind and solar power, have transient characteristics, which require energy storage. Renewable energy storage systems such as redox flow batteries (RFBs) have attracted significant attention for electricity grid, electric vehicles, and other large-scale stationary applications. RFB is an electrochemical energy storage system that reversibly converts chemical energy directly to electricity. RFBs are composed of two tanks filled with active materials comprising metal ions that may be in different valance states, two circulation pumps, a flow cell with a separation membrane, and a current collector. The separation membrane is located between the anode and the cathode and is used to separate the anolyte and the catholyte, as well as to utilize the current circuit by allowing the transfer of balancing ions.

The current collector represent a significant proportion of the cost of the system relative to the other components. The current collector adds resistance between the terminal battery connections and the cells. In order to minimize resistance and optimize current distribution in end cells, conductive metal plates, such as copper, that press against the terminal cell end plates are used. The plates are expensive and are prone to corrosion. To minimize the corrosion risk, the plates are frequently coated with a noble metal, which adds to the cost of the battery. In addition, the plates have to contact the terminal cell end plates with high surface pressure. In order to achieve the high surface pressure needed, robust compression plates and hardware are generally required. This adds to the cost and stack assembly effort.

Therefore, there is a need for inexpensive, current collectors for redox flow batteries which are not prone to corrosion.

DESCRIPTION

Figure 1:
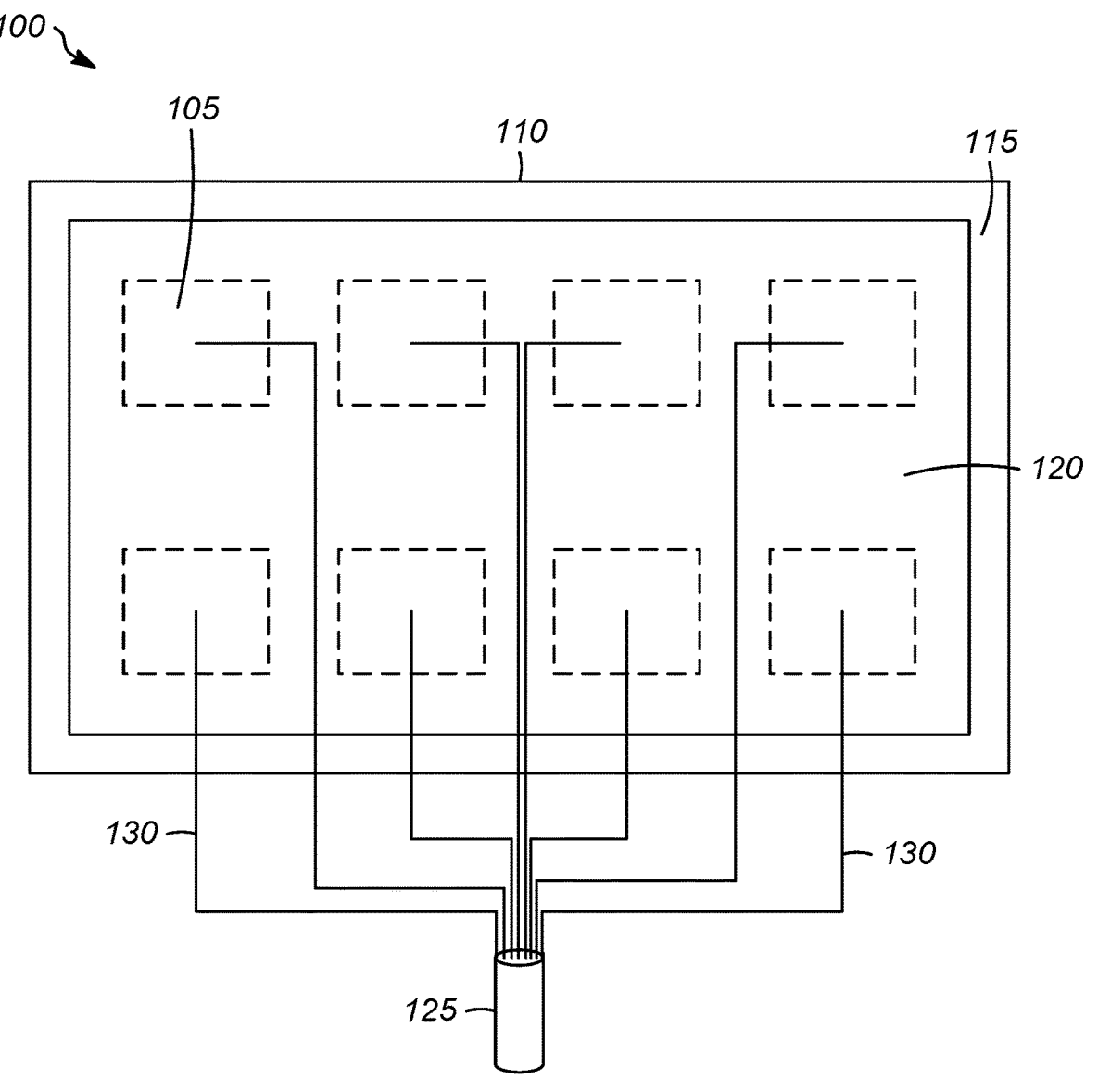
FIG. 1 is an illustration of one embodiment of a collector plate according to the present invention.

The present invention meets this need by providing several types of inexpensive, current collectors.

In one embodiment, the current collector is at least one metal plate encapsulated in a conductive polymer end plate. The metal plate can be a plurality of individual metal plates, or it can be a single metal plate. The metal plate can be any conductive metal. Suitable metals include, but are not limited to, copper, aluminum, stainless steel, steel, titanium, brass, bronze, and combinations thereof.

When multiple individual metal plates are used, all of the plates are encapsulated in the conductive polymer end plate. Each individual metal plate is connected to the terminal stack dielectric cable by an individual wire. The advantage of using multiple metal plates and multiple wires is that it allows control of the current and voltage to each tab, ensuring that equal current and voltage distribution is achieved in the stack's end cells.

When a single metal plate is used, only a single connection is needed. The shape of the metal plate can be optimized using experimentally determined contact and bulk material resistances and electromechanical modeling to determine the geometry that best minimizes material usage and equilibrates current across a cell's active area.

Encapsulating the at least one metal plate reduces the corrosion risk, minimizes the contact resistance with minimal compression required, and it is easier to assemble than two separate pieces. The conductive polymer end plate can be made of any polymer composite that is conductive. The polymer composite may comprise a polymer and either carbon or titanium. Suitable polymers include, but are not limited to, thermoplastic materials such as polyethylene, polypropylene, and polyphenylene sulfide, and thermoset polymers, such as epoxies, silicones, polyurethanes, and phenolics.

Another design involves adhering the metal plate to the back of a conductive end plate of the stack with a conductive adhesive. The metal can be any of the metals discussed above. Suitable conductive adhesives comprise conductive fillers including, but not limited to, silver, nickel, copper, and graphite. The metal is typically in the form of metals, metal oxides, and metal nitrides. Suitable adhesives include, but are not limited to, epoxies, polyimides, and urethanes. The conductive filler will typically comprise 70% or more of the total mass of the conductive adhesive. The conductive adhesives can be structural or semi-structural paste of liquid adhesives. The conductive end plate can be made of carbon, titanium, or a polymer composite that is conductive. The polymer composite comprises a polymer and carbon. Suitable polymers include, but are not limited to, thermoplastic materials such as polyethylene, polypropylene, and polyphenylene sulfide, and thermoset polymers, such as epoxies, silicones, polyurethanes, and phenolics.

Another design involves the use of a flat metal plate having deformable tabs. The tabs are cut into the metal plate. When the battery stack is assembled and bolted together, the tabs are bent back to being flat. This ensures that the desired current collector to end plate contact pressure at the location of the bendable tabs is achieved. The tabs can be any suitable size and shape.

In some embodiments, the current collector can be easily replaced without having to disassemble the stack. This is accomplished by including an insulating plate having a pocket designed to fit the current collector which is accessible from outside the assembled stack. When the metal plate with the deformable tabs is corroded, it can be removed, and a new plate inserted into the pocket. The current collector can be designed with a beveled edge to aid in insertion.

FIG. 1 shows one embodiment of a current collector 100. The current collector 100 has a plurality of conductive metal plates 105 encapsulated in a conductive polymer end plate 110. The conductive polymer end plate 110 has an inactive area 115 surrounding the active area 120 where the conductive metal plates 105 are located. The conductive metal plates 105 can be encapsulated during the forming process for the conductive polymer end plate 110 using an overmolding process or an insert molding process, for example. Other forming processes could also be used.

Each of the conductive metal plates 105 are connected to the terminal stack electrical cable or connector 125 by individual wires 130.

Figure 2:
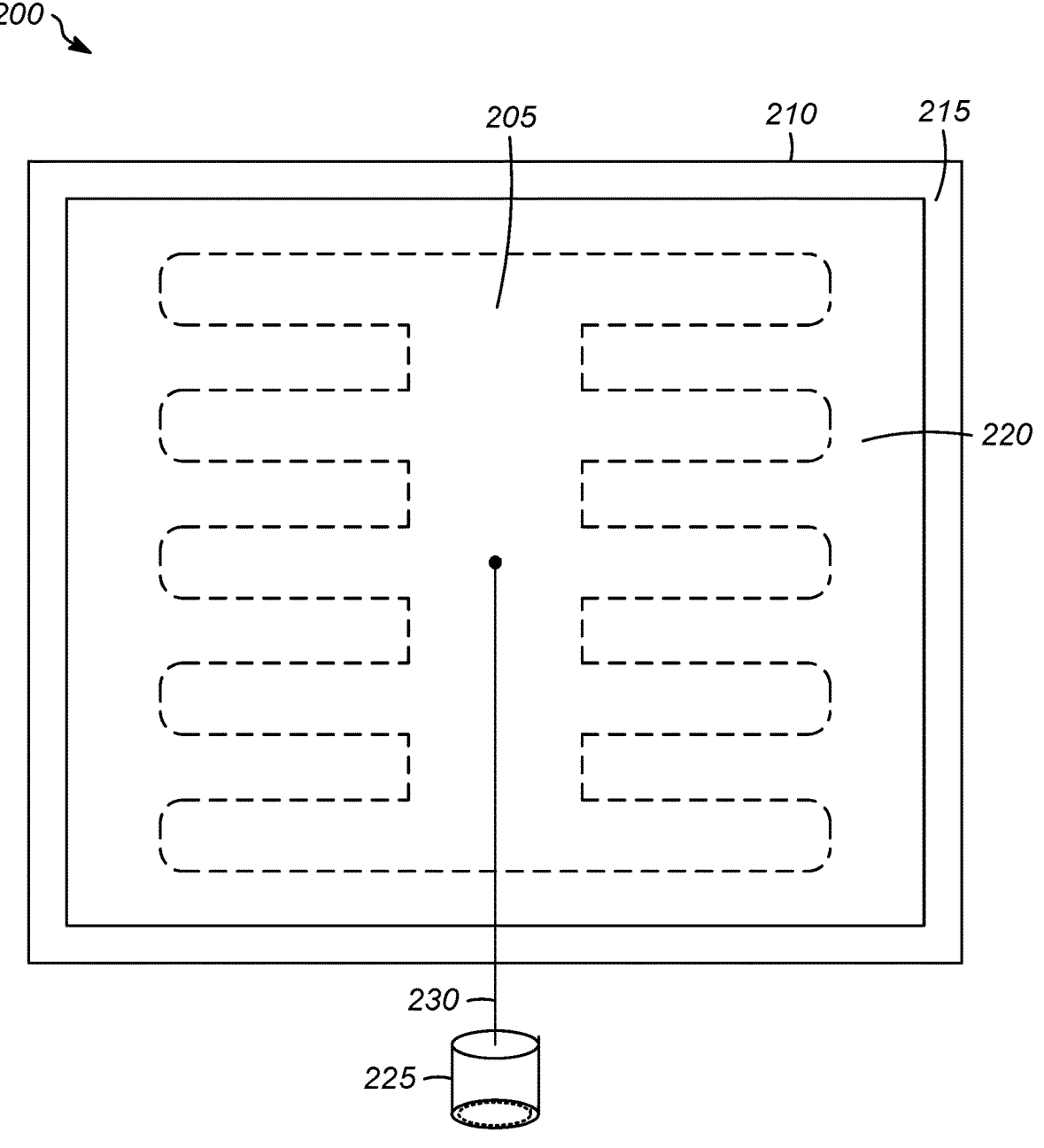
FIG. 2 is an illustration of another embodiment of a collector plate according to the present invention.

FIG. 2 shows another embodiment of a current collector 200 with a single conductive metal plate 205. The single conductive metal plate 205 is encapsulated in the conductive end plate 210 which has an inactive area 215 surrounding the active area 220 where the conductive metal plate 205 is located. The conductive metal plate 205 can be encapsulated during the forming process for the conductive polymer end plate 110 as discussed above.

The single conductive metal plate 205 can have a variety of sizes and shapes. The size and shape can be designed to minimize material usage and to provide proper current density.

The conductive metal plate 205 is connected to the terminal stack electrical cable or connector 225 by a single wire 230.

Figure 3:
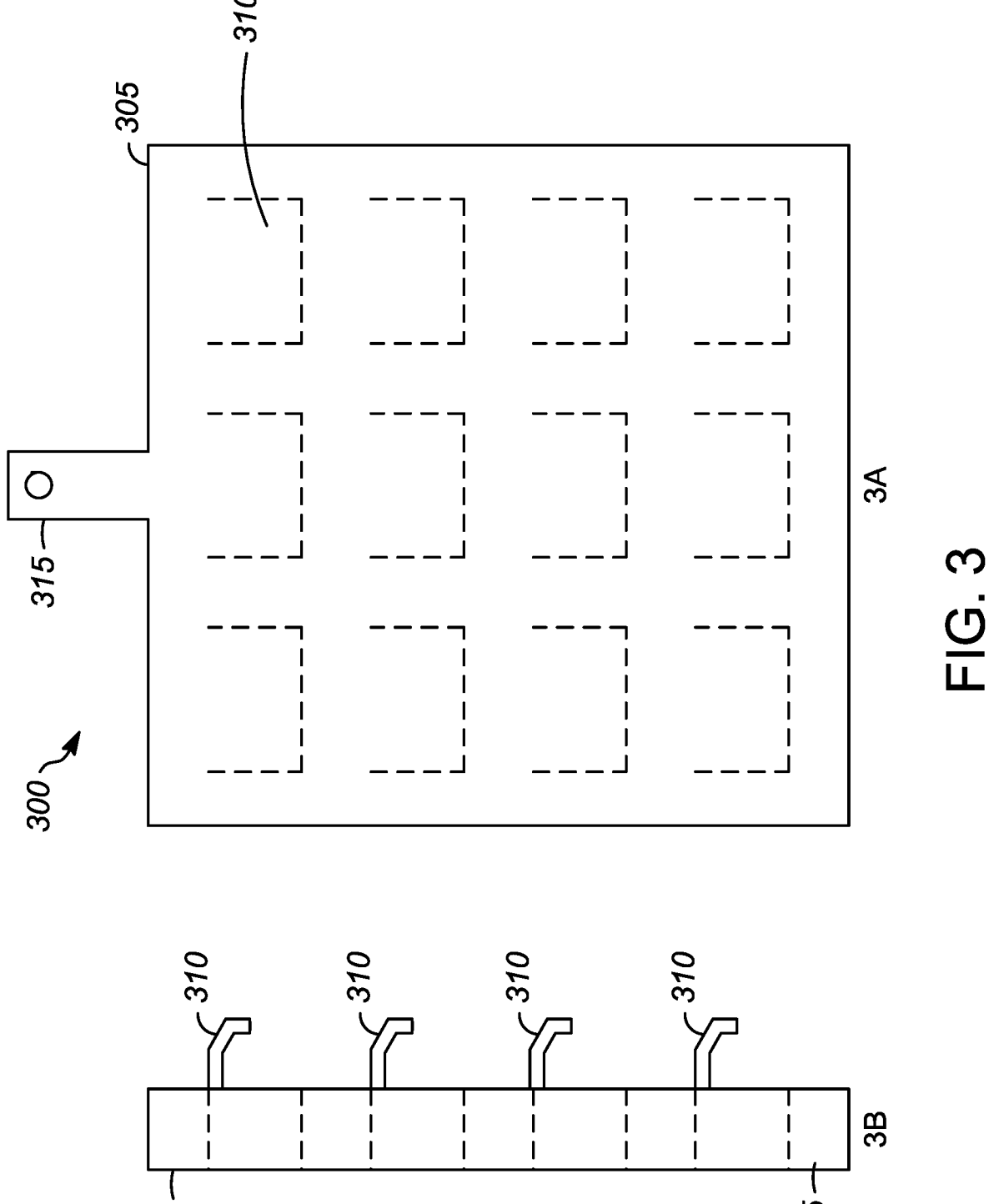
FIG. 3 is an illustration of another embodiment of a collector plate according to the present invention.

FIG. 3 shows another embodiment of the current connector 300. The current connector 300 is a conductive metal plate 305 having at least one deformable tab 310. There is a terminal battery connector tab 315. The conductive metal plate 305 is placed next to an end plate for a stack of cells. The deformable tabs 310 are compressed when the stack is assembled providing good contact pressure between the end plate and the conductive metal plate 305.

Figure 4:
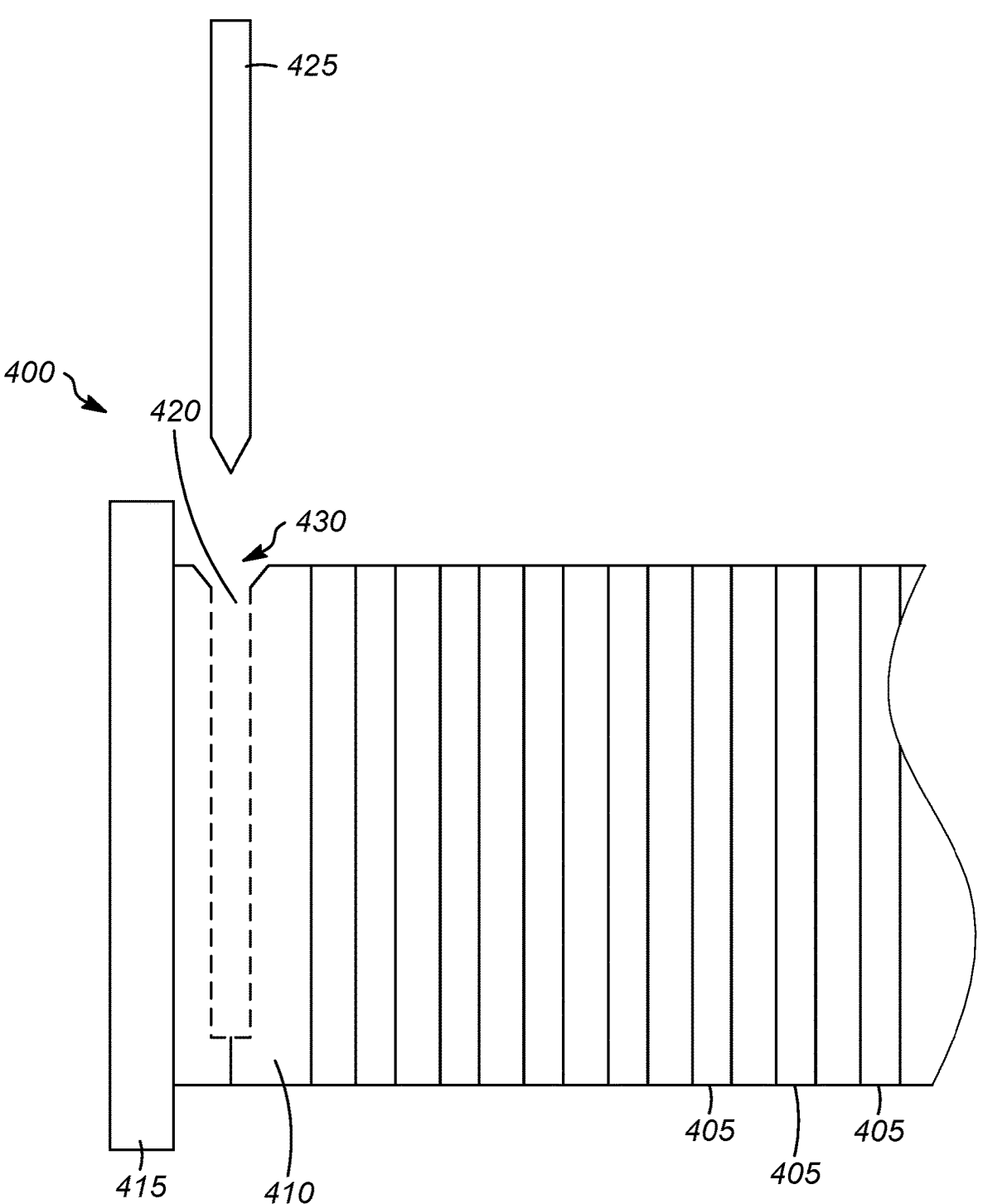
FIG. 4 is an illustration of one embodiment of a portion of a cell stack incorporating one embodiment of a collector plate according to the present invention.

FIG. 4 shows a portion of a cell stack 400. The cell stack 400 includes a plurality of cells 405. At the end of the cell stack 400, there is an insulating plate 410 and a compression plate 415. The insulating plate 410 has a pocket 420 which is designed so that the current collector 425 fits into it. The current collector 425 can have a beveled bottom edge 430 to aid in inserting the current collector 425 into the pocket 420. The pocket 420 is accessible from outside the cell stack 400 so that the cell stack does not have to be taken apart to replace the current collector 425. The current collector 425 can be any suitable current collector, including, but not limited to, commercially available current collectors and the current collector of FIG. 3.

SPECIFIC EMBODIMENTS

While the following is described in conjunction with specific embodiments, it will be understood that this description is intended to illustrate and not limit the scope of the preceding description and the appended claims.

A first embodiment of the invention is a current collector for a flow battery comprising at least one conductive metal plate encapsulated in a conductive polymer end plate, a conductive metal plate adhesively attached to a conductive end plate with a conductive adhesive, or a conductive metal plate with at least one deformable tab extending outward from the metal plate. An embodiment of the invention is one, any or all of prior embodiments in this paragraph up through the first embodiment in this paragraph wherein the current collector comprises the at least one conductive metal plate encapsulated in the conductive polymer end plate, and wherein the at least one conductive metal plate comprises a plurality of individual conductive metal plates encapsulated in the conductive polymer end plate. An embodiment of the invention is one, any or all of prior embodiments in this paragraph up through the first embodiment in this paragraph wherein the current collector comprises the at least one conductive metal plate encapsulated in the conductive polymer end plate, and wherein the at least one conductive metal plate comprises a single conductive metal plate encapsulated in the conductive polymer end plate. An embodiment of the invention is one, any or all of prior embodiments in this paragraph up through the first embodiment in this paragraph wherein the conductive metal comprises copper, aluminum, stainless steel, steel, titanium, brass, bronze, and combinations thereof. An embodiment of the invention is one, any or all of prior embodiments in this paragraph up through the first embodiment in this paragraph wherein the conductive polymer end plate comprises a polymer composite comprising a thermoplastic or thermoset polymer and carbon or titanium. An embodiment of the invention is one, any or all of prior embodiments in this paragraph up through the first embodiment in this paragraph wherein the current collector comprises the conductive metal plate adhesively attached to the conductive end plate with the conductive adhesive. An embodiment of the invention is one, any or all of prior embodiments in this paragraph up through the first embodiment in this paragraph wherein the conductive adhesive comprises an adhesive polymer and a conductive filler. An embodiment of the invention is one, any or all of prior embodiments in this paragraph up through the first embodiment in this paragraph wherein the conductive end plate comprises carbon, titanium, or a polymer composite comprising a polymer and carbon. An embodiment of the invention is one, any or all of prior embodiments in this paragraph up through the first embodiment in this paragraph wherein the current collector comprises the conductive metal plate with the at least one deformable tab extending outward from the metal plate.

A second embodiment of the invention is a redox flow battery system comprising at least one rechargeable cell comprising a positive electrolyte, a negative electrolyte, a separator positioned between the positive electrolyte and the negative electrolyte, the positive electrolyte in contact with a positive electrode, and the negative electrolyte in contact with a negative electrode, a first current collector in electrical communication with the negative electrode, and a second current collector in electrical communication with the positive electrode; wherein the first current collector or the second current collector, or both comprises at least one conductive metal plate encapsulated in a conductive polymer end plate, a conductive metal plate adhesively attached to a conductive end plate with a conductive adhesive, or a conductive metal plate with at least one deformable tab extending outward from the conductive metal plate. An embodiment of the invention is one, any or all of prior embodiments in this paragraph up through the second embodiment in this paragraph wherein the current collector comprises the at least one conductive metal plate encapsulated in the conductive polymer end plate, and wherein the at least one conductive metal plate comprises a plurality of individual conductive metal plates encapsulated in the conductive polymer end plate. An embodiment of the invention is one, any or all of prior embodiments in this paragraph up through the second embodiment in this paragraph wherein the current collector comprises the at least one conductive metal plate encapsulated in the conductive polymer end plate, and wherein the at least one conductive metal plate comprises a single conductive metal plate encapsulated in the conductive polymer end plate. An embodiment of the invention is one, any or all of prior embodiments in this paragraph up through the second embodiment in this paragraph wherein the conductive metal comprises copper, aluminum, stainless steel, steel, titanium, brass, bronze, and combinations thereof. An embodiment of the invention is one, any or all of prior embodiments in this paragraph up through the second embodiment in this paragraph wherein the conductive polymer comprises a polymer composite comprising a thermoplastic or thermoset polymer and carbon or titanium. An embodiment of the invention is one, any or all of prior embodiments in this paragraph up through the second embodiment in this paragraph wherein the current collector comprises the conductive metal plate adhesively attached to the conductive end plate with the conductive adhesive. An embodiment of the invention is one, any or all of prior embodiments in this paragraph up through the second embodiment in this paragraph wherein the conductive adhesive comprises an adhesive polymer and a conductive filler. An embodiment of the invention is one, any or all of prior embodiments in this paragraph up through the second embodiment in this paragraph wherein the conductive end plate comprises carbon, titanium, or a polymer composite comprising a polymer and carbon. An embodiment of the invention is one, any or all of prior embodiments in this paragraph up through the second embodiment in this paragraph wherein the current collector comprises the conductive metal plate with the at least one deformable tab extending outward from the conductive metal plate. An embodiment of the invention is one, any or all of prior embodiments in this paragraph up through the second embodiment in this paragraph further comprising an insulating plate having a pocket configured to accept the current collector.

A third embodiment of the invention is a redox flow battery system comprising at least one rechargeable cell comprising a positive electrolyte, a negative electrolyte, a separator positioned between the positive electrolyte and the negative electrolyte, the positive electrolyte in contact with a positive electrode, and the negative electrolyte in contact with a negative electrode, a first current collector in electrical communication with the negative electrode, a second current collector in electrical communication with the positive electrode, and an insulating plate having a pocket, the pocket configured to accept the first current collector or the second current collector.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

What is claimed is:

1. A current collector for a flow battery comprising:
at least one conductive metal plate encapsulated in a conductive polymer end plate wherein the at least one conductive metal plate comprises a plurality of individual conductive metal plates encapsulated in the conductive polymer end plate.

2. The current collector of claim 1 wherein the conductive metal comprises copper, aluminum, stainless steel, steel, titanium, brass, bronze, and combinations thereof.

3. The current collector of claim 1 wherein the conductive polymer end plate comprises a polymer composite comprising a thermoplastic or thermoset polymer and carbon or titanium.

4. A redox flow battery system comprising:
at least one rechargeable cell comprising a positive electrolyte, a negative electrolyte, a separator positioned between the positive electrolyte and the negative electrolyte, the positive electrolyte in contact with a positive electrode, and the negative electrolyte in contact with a negative electrode, a first current collector in electrical communication with the negative electrode, and a second current collector in electrical communication with the positive electrode;
wherein the first current collector or the second current collector, or both comprises at least one conductive metal plate encapsulated in a conductive polymer end plate wherein the at least one conductive metal plate comprises a plurality of individual conductive metal plates encapsulated in the conductive polymer end plate.

5. The flow battery system of claim 4 wherein the conductive metal comprises copper, aluminum, stainless steel, steel, titanium, brass, bronze, and combinations thereof.

6. The flow battery system of claim 4 wherein the conductive polymer comprises a polymer composite comprising a thermoplastic or thermoset polymer and carbon or titanium.

7. The flow battery system of claim 4 further comprising an insulating plate having a pocket configured to accept the current collector.

* * * * *